US012656103B2

(12) United States Patent
Lee et al.

(10) Patent No.: US 12,656,103 B2
(45) Date of Patent: Jun. 16, 2026

(54) PLURALITY LAYER THICKNESS MEASURING DEVICE AND METHOD WITH FAST FOURIER TRANSFORM

(71) Applicant: SAMSUNG DISPLAY CO., LTD., Yongin-si (KR)

(72) Inventors: Jonghwan Lee, Yongin-si (KR); Yong Jun Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 172 days.

(21) Appl. No.: 18/417,988

(22) Filed: Jan. 19, 2024

(65) Prior Publication Data

US 2024/0369349 A1     Nov. 7, 2024

(30) Foreign Application Priority Data

May 2, 2023     (KR) ........................ 10-2023-0057073

(51) Int. Cl.
G01B 11/06          (2006.01)

(52) U.S. Cl.
CPC .................................... G01B 11/06 (2013.01)

(58) Field of Classification Search
CPC . G01B 11/06; G01B 11/0625; G01B 11/0633; G01N 21/25; G01N 21/8422; G01N 2201/08
See application file for complete search history.

(56) References Cited

U.S. PATENT DOCUMENTS

| | | | | |
|---|---|---|---|---|
| 5,587,792 A | * | 12/1996 | Nishizawa | ......... G01B 11/0625 |
| | | | | 356/497 |
| 8,279,453 B2 | * | 10/2012 | Nishida | ............. G01B 11/0625 |
| | | | | 356/630 |
| 8,338,194 B2 | * | 12/2012 | Hesse | .................... G01N 21/45 |
| | | | | 438/16 |
| 9,727,052 B2 | * | 8/2017 | Price | ...................... G02B 5/285 |
| 10,256,104 B2 | * | 4/2019 | Kimba | .................. B24B 37/205 |
| 2006/0082786 A1 | * | 4/2006 | Kim | .................. G01B 11/0625 |
| | | | | 356/504 |

(Continued)

FOREIGN PATENT DOCUMENTS

| | | |
|---|---|---|
| KR | 10-0393522 | 7/2003 |
| KR | 10-2006-0061662 | 6/2006 |

(Continued)

*Primary Examiner* — Rebecca C Bryant
(74) *Attorney, Agent, or Firm* — F. CHAU & ASSOCIATES, LLC

(57) ABSTRACT

A thickness measuring device includes: a light source circuit including: a light source which irradiates light to a surface of a substrate including a plurality of thin films and a lens which magnifies light emitted from the light source or reflected from the surface of the substrate, a detector circuit including a spectrometer which measures a reflectance for each wavelength of light reflected from the surface of the substrate and passed through the lens to generate reflectance values and which derives reflectance spectrum data for each wavelength from the reflectance values, and a control circuit which converts the reflectance spectrum data for each wavelength into a digital signal and calculates a thickness of at least one thin film among the plurality of thin films by performing fast Fourier transform on the digital signal.

18 Claims, 7 Drawing Sheets

(56)                     References Cited

U.S. PATENT DOCUMENTS

2011/0089348 A1 *    4/2011   Finarov ................. G01N 21/31
                                                     250/559.39

FOREIGN PATENT DOCUMENTS

| | | |
|---|---|---|
| KR | 10-0818009 | 4/2008 |
| KR | 10-0829464 | 5/2008 |
| KR | 10-1930317 | 12/2018 |

* cited by examiner

PLURALITY LAYER THICKNESS MEASURING DEVICE AND METHOD WITH FAST FOURIER TRANSFORM

CROSS-REFERENCE TO RELATED APPLICATION

This U.S. patent application claims priority under 35 USC § 119 to Korean Patent Application No. 10-2023-0057073, filed on May 2, 2023 in the Korean Intellectual Property Office (KIPO), the entire disclosure of which incorporated by reference in its entirety herein.

TECHNICAL FIELD

Embodiments of the present disclosure are generally directed to a thickness measuring device. More particularly, embodiments of the present disclosure are directed to a thickness measuring device that measures a thickness of a thin film inside a display device and a thickness measuring method using the same.

DISCUSSION OF RELATED ART

A display device may include a plurality of thin films. A thickness of the thin films is an important control factor that greatly affects manufacturing yield and reliability. Thus, there is need for real-time measurement of these thin films in the manufacturing process of a display device.

In a previous method, a tag area had to be separately manufactured to enable the thickness of a thin film within the tag area to be measured. However, since the thickness of the thin film in the tag area and a display area of the display device are different, a measurement accuracy of a thickness determined through this method is low.

SUMMARY

Embodiments of the disclosure provide a thickness measuring device with increased measurement accuracy.

Embodiments of the disclosure provide a thickness measuring method using the thickness measuring device.

A thickness measuring device according to an embodiment of the present disclosure includes a light source circuit, a detector circuit, and a control circuit. The light source circuit includes: a light source which irradiates light to a surface of a substrate including a plurality of thin films and a lens which magnifies light emitted from the light source or reflected from the surface of the substrate. The detector circuit includes a spectrometer which measures reflectance for each wavelength of light reflected from the surface of the substrate and passed through the lens to generate reflectance values and which derives reflectance spectrum data for each wavelength form the reflectance values. The control circuit converts the reflectance spectrum data for each wavelength into a digital signal and calculates a thickness of at least one thin film among the plurality of thin films by a performing fast Fourier transform on the converted digital signal.

In an embodiment, the light source portion may irradiate the light in a direction perpendicular to the surface of the substrate.

In an embodiment, the plurality of thin films may include at least one organic layer including an organic material, at least one inorganic layer including an inorganic material, and at least one conductive layer including a conductive material.

In an embodiment, the control circuit may calculate a thickness of the organic layer among the plurality of thin films.

In an embodiment, the thickness of the organic layer may be greater than a thickness of the inorganic layer and a thickness of the conductive layer.

In an embodiment, the lens may have a magnification of about 10 times.

In an embodiment, the light source circuit may further include an optical fiber which focuses the light emitted from the light source and irradiates the light through one side of the optical fiber, and receives the light reflected from the surface of the substrate and emits the light through another side of the optical fiber.

In an embodiment, a size of the optical fiber may range from about 50 micrometers to about 500 micrometers.

In an embodiment, an electrode layer having a higher reflectance than each of the plurality of thin films may be disposed under the plurality of thin films.

In an embodiment, the light source portion may irradiate the light to an area overlapping the electrode layer.

In an embodiment, a width of a spot size generated when the light emitted from the light source meets the surface of the substrate may be less than or equal to a width of the electrode layer.

In an embodiment, a wavelength of the light emitted from the light source may range from about 600 nanometers to 800 nanometers.

A thickness measuring method according to an embodiment of the present disclosure includes: irradiating light emitted from a light source on a surface of a substrate including a plurality of thin films, measuring a reflectance for each wavelength of light reflected from the surface of the substrate and passed through a lens to generate reflectance values, deriving reflectance spectrum data for each wavelength from the reflectance values, converting the reflectance spectrum data for each wavelength into a digital signal, performing a fast Fourier transform on the digital signal, and calculating a thickness of at least one thin film among the plurality of thin films from a result of the first Fourier transform.

In an embodiment, the calculating the thickness of at least one thin film may include measuring a refractive index of each of the plurality of thin films.

In an embodiment, the light source may irradiate light to an area overlapping with an electrode layer having a reflectance higher than a reflectance of each of the plurality of thin films under the plurality of thin films.

In an embodiment, the thickness measuring method may further include adjusting a magnification of the lens so that a width of a spot size generated when the light meets the surface of the substrate is less than or equal to a width of the electrode layer.

In an embodiment, the irradiating the light on the surface of the substrate may include irradiating the light through one end of an optical fiber.

In an embodiment, the thickness measuring method may further include emitting the light through another side of the optical fiber by receiving the light reflected from the surface of the substrate and passed through the lens into the optical fiber.

In an embodiment, the thickness measuring method may further include adjusting a size of the optical fiber so that a width of a spot size generated when the light meets the surface of the substrate is less than or equal to a width of the electrode layer.

A thickness measuring device according to an embodiment of the present disclosure includes a light source circuit, a detector circuit, and a control circuit. The light source circuit includes a light source which irradiates light to a surface of a substrate including a plurality of thin films and a lens which magnifies light emitted from the light source or reflected from the surface of the substrate. The detector circuit measures a reflectance for each wavelength of light reflected from the surface of the substrate and passed through the lens to generate a plurality of reflectance values and derives reflectance spectrum data for each wavelength from the reflectance values. The control circuit calculates thicknesses of each of the thin films by performing a fast Fourier transform on the reflectance spectrum data and determines a thickness of an organic layer of the thin film layers from a highest one of the thicknesses.

In a thickness measuring device according to an embodiment of the present disclosure, by measuring an entire area of a substrate using the thickness measuring device, the thickness of an organic layer among a plurality of thin films may be selectively measured. In an embodiment, by measuring the entire area of the substrate, the thickness of each area of the organic layer may be measured. Therefore, the thickness of the organic layer can be measured without a separate tag area. In addition, since the thickness of the organic layer within a display area of the substrate can be directly measured, measurement accuracy can be increased.

DETAILED DESCRIPTION

Figure 1:
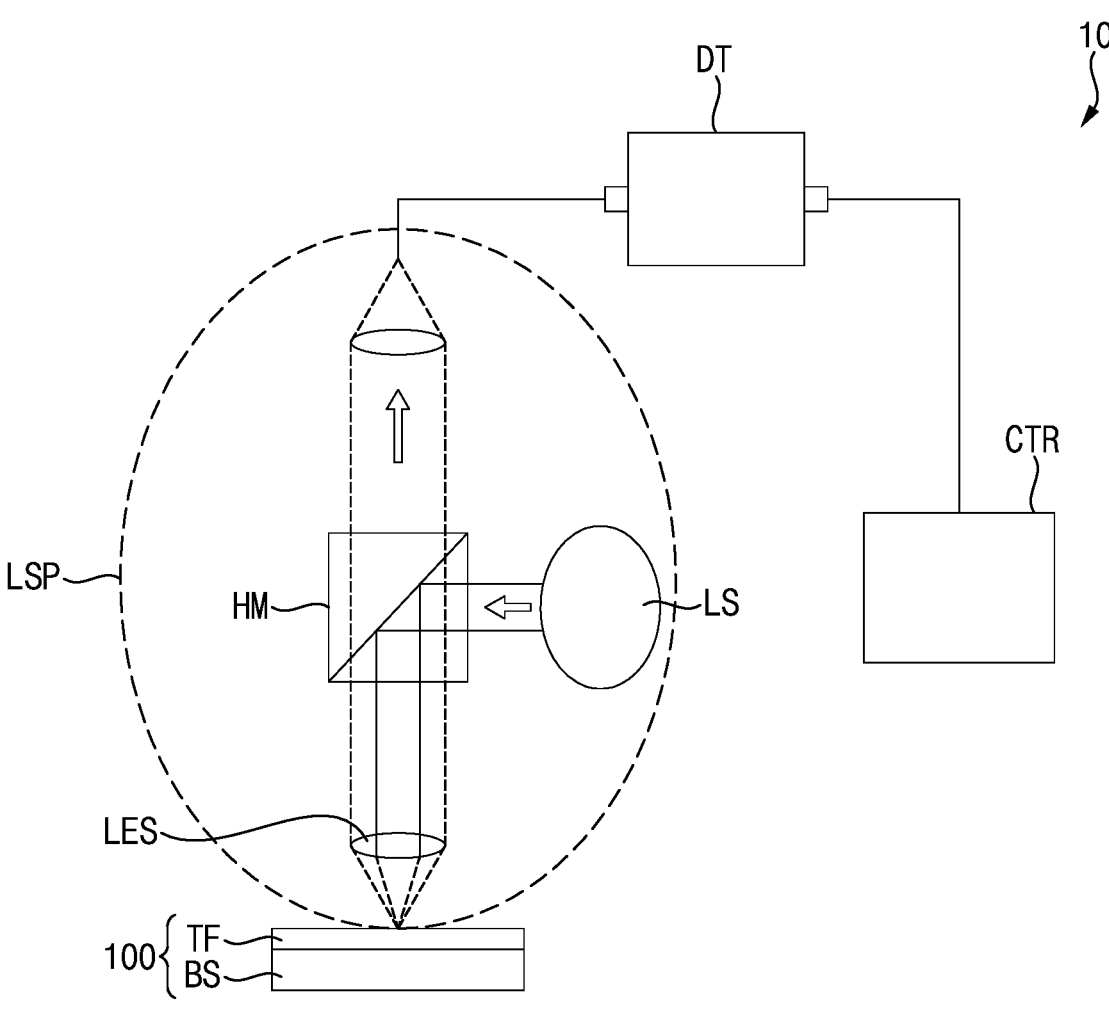
FIG. 1 is a view schematically illustrating a thickness measuring device according to an embodiment of the present disclosure.

Hereinafter, embodiments of the present disclosure will be explained in detail with reference to the accompanying drawings; however, they may be embodied in different forms and should not be construed as limited to the embodiments set forth herein.

It will be understood that when an element is referred to as being "between" two elements, it can be the only element between the two elements, or one or more intervening elements may also be present. Like reference numerals may refer to like elements throughout.

The term "about" as used herein is inclusive of the stated value and means within an acceptable range of deviation for the particular value as determined by one of ordinary skill in the art, considering the measurement in question and the error associated with measurement of the particular quantity, such as the limitations of the measurement system. For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

FIG. 1 is a view schematically illustrating a thickness measuring device according to an embodiment of the present disclosure.

Referring to FIG. 1, a thickness measuring device 10 may include a light source portion LSP (e.g., a portion including a light source or a light source circuit), a detector DT (e.g., a detector circuit), and a control portion CTR (e.g., a control circuit). The thickness measuring device 10 may measure the thickness of a plurality of thin films TF included in a substrate 100. The substrate 100 is a measurement object and may be, for example, a display device.

The light source portion LSP may include a light source LS, lenses LES, and a half mirror HM.

In an embodiment, the light source LS irradiates light to the surface of the substrate one hundred. For example, the light source LS may emit white light. The wavelength of light emitted by the light source LS may range from about 600 nanometers to about 800 nanometers. That is, the intensity of light emitted from the light source LS may have the greatest intensity at a wavelength ranging from about 600 nanometers to about 800 nanometers. When the wavelength of light is between about 600 nanometers and about 800 nanometers, and the light is irradiated to the plurality of thin films TF, an organic layer included in the plurality of thin films TF may have transparent characteristics. However, the present disclosure is not limited thereto.

In an embodiment, the lens LES magnifies light emitted from the light source LS or light reflected from the surface of the substrate 100. For example, the magnification of the lens LES may be about 10 times. However, the present disclosure is not limited thereto. In an embodiment, the magnification of the lens LES is dynamically adjustable. For example, the light source portion LSP may include a plurality of lenses each with a different magnification factor, where an actuator moves a corresponding one of the lenses into place in response to a control signal. For example, the control signal may be provided by the control portion CTR and indicate which one of the lenses to select. In this way, a certain magnification factor may be selected so that a width W1 of a spot size SS is less than or equal to a width W2 of an electrode layer EDL (see FIG. 3 and FIG. 4).

Light emitted from the light source LS may be reflected by the half mirror HM, pass through the lens LES, and reach the surface of the substrate 100. In addition, the light reflected from the surface of the substrate 100 may again pass through the lens LES, pass through the half mirror HM, and then pass through another lens to reach the detector DT.

In an embodiment, the light source portion LSP irradiates emitted light in a direction perpendicular to the surface of the substrate 100.

In an embodiment, the detector DT includes a spectrometer. The detector DT may detect light reflected from the surface of the substrate 100 and passed through the lens LES. In an embodiment, the spectrometer measures reflectance for each wavelength of light reflected from the surface of the substrate 100 and passed through the lens LES. Reflectance may indicate how much light is transmitted from a surface of the substrate 100 and reflectance of a particular wavelength may indicate much light of the particular wavelength is transmitted from the surface. In addition, the detector DT may derive reflectance spectrum data for each wavelength (see FIG. 6).

In an embodiment, the control portion CTR converts the reflectance spectrum data for each wavelength derived through the detector DT into a digital signal. In an embodiment, the control portion CTR performs a fast Fourier transform on the converted digital signal (see FIG. 7). The control portion CTR may calculate a thickness of at least one thin film among the plurality of thin films TF using a result of performing the fast Fourier transform. Accordingly, the thickness of at least one thin film among the plurality of thin films TF included in the substrate 100 may be derived using the thickness measuring device 10. Accordingly, it is possible to measure how thick or thin a thin film is in an area of the substrate 100. In an embodiment, the fast Fourier transform is performed directly on the reflectance spectrum data to generate reflectance values and a thickness of at least of the thin films is determined from a result of the fast Fourier transform. FIGS. 2, 3, 4, 5, 6, and 7 are views illustrating a thickness measurement method according to an embodiment of the present disclosure.

The substrate whose thickness is to be measured will be described with reference to FIGS. 2, 3, and 4. For example, the substrate 100 may be a display device.

Figure 2:
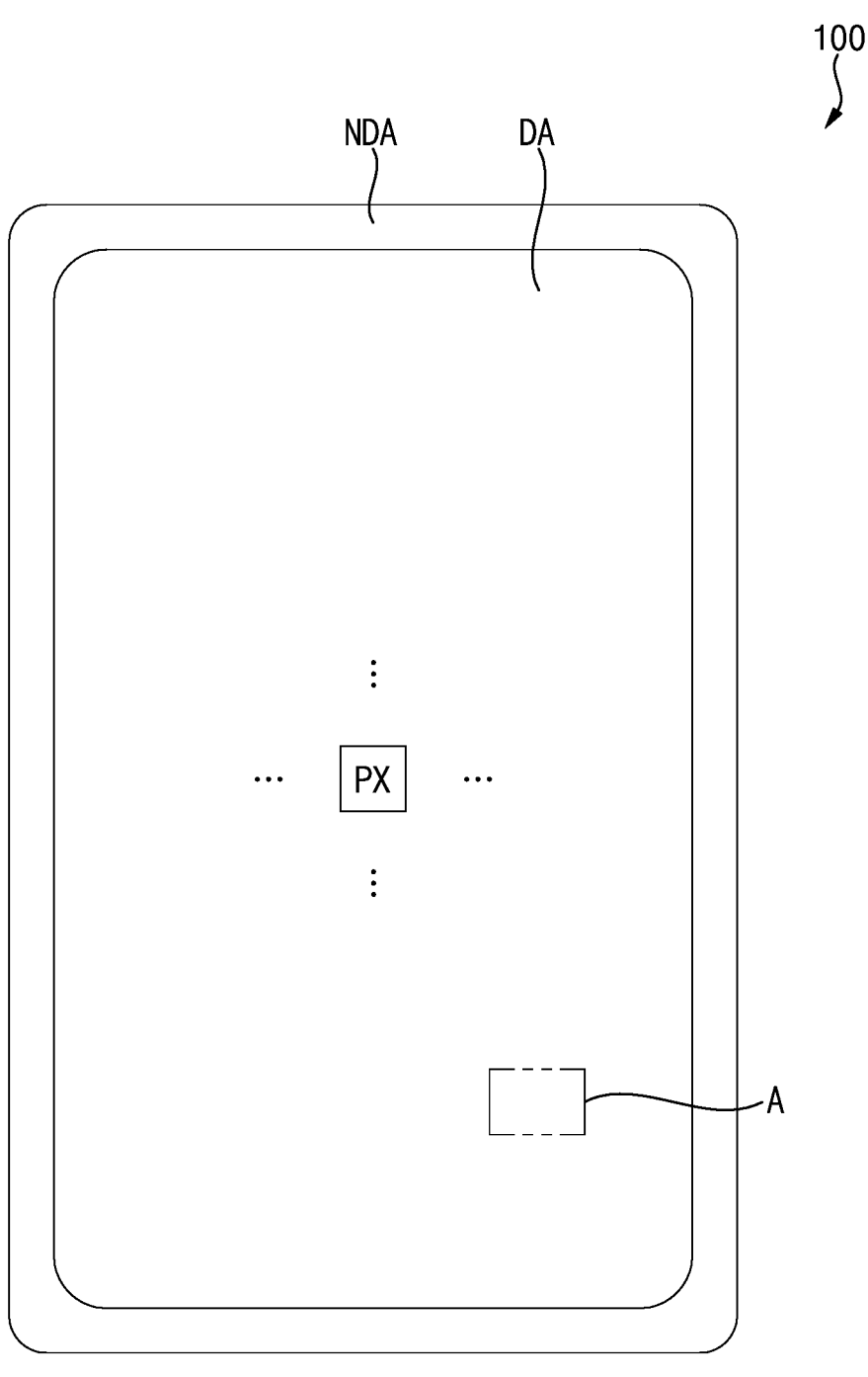
FIG. 2 is a plan view illustrating the substrate of FIG. 1.

FIG. 2 is a plan view illustrating the substrate 100 of FIG. 1.

Referring to FIG. 2, the substrate 100 may include a display area DA and a non-display area NDA. The display area DA may be an area that displays an image. The planar shape of the display area DA may be a rectangular shape or, as shown in FIG. 1, a rectangular shape with rounded corners. However, the planar shape of the display area DA is not limited thereto. For example, the display area DA may have various planar shapes such as circular, oval, polygonal shapes, or the like.

The non-display area NDA may be arranged around the display area DA. The non-display area NDA may surround the display area DA. The non-display area NDA may be an area which does not display images. In an embodiment, drivers for displaying images in the display area DA may be disposed in the non-display area NDA.

A plurality of pixels PX may be arranged in a matrix in the display area DA. Signal lines such as gate lines and data lines may be disposed in the display area DA. The signal lines, such as the gate line and the data line, may be connected to each of the plurality of pixels PX. Each of the plurality of pixels PX may receive a gate signal, a data signal, and the like from the signal line.

Figure 3:
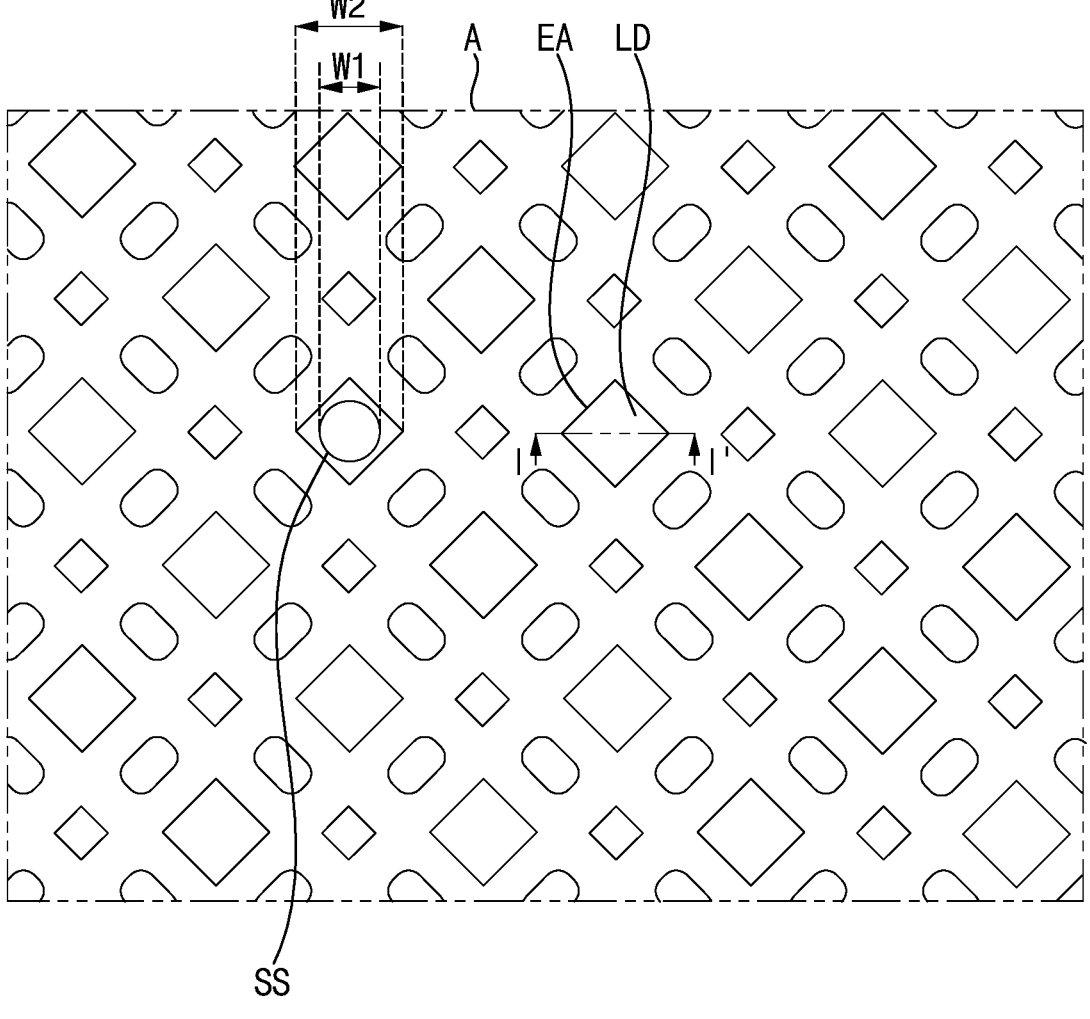
FIG. 3 is an enlarged plan view of area A of FIG. 2.

FIG. 3 is an enlarged plan view of an area A of FIG. 2. FIG. 4 is a cross-sectional view taken along line I-I' of FIG. 3.

Figure 4:
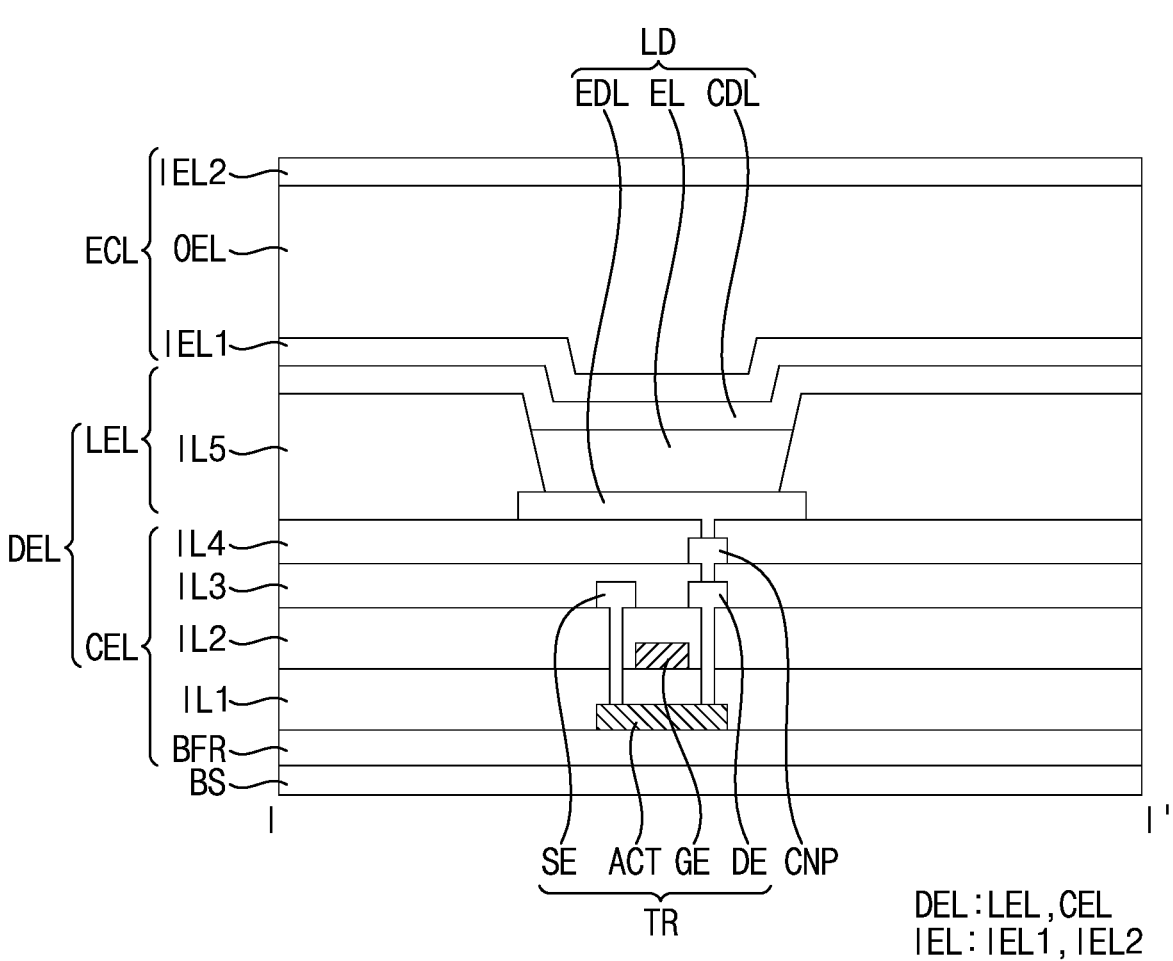
FIG. 4 is a cross-sectional view taken along line I-I' of FIG. 3.

Referring to FIGS. 2, 3, and 4, each of the plurality of pixels PX may include a plurality of light emitting areas EA which emit light. Each of the plurality of light emitting areas EA may include a light emitting diode LD which emits first light. The first light may be white light.

However, the present disclosure is not limited thereto. While the light emitting diode LD is illustrated as having a rectangular planar shape, the present disclosure is not limited thereto. For example, the light emitting diode LD may have a polygonal, circular, oval, or irregular shape other than a square. In an embodiment, the size of the light emitting diode LD is the same as or substantially the same as the size of an electrode layer EDL (see FIG. 4) included in the light emitting diode LD.

In an embodiment, the substrate 100 includes the plurality of thin films TF. In an embodiment, the plurality of thin films TF include at least one organic layer OEL including an organic material, at least one inorganic layer IEL including an inorganic material, and at least one conductive layer CDL including a conductive material.

The substrate 100 may include a base substrate BS, a display element layer DEL, and an encapsulation layer ECL. The display device layer DEL may include a circuit element layer CEL and a light emitting element layer LEL.

The circuit element layer CEL may be disposed on the base substrate BS, and may include a buffer layer BFR, at least one transistor TR, a connection electrode CNP, a first insulating layer IL1, a second insulating layer IL2, a third insulating layer IL3, and a fourth insulating layer IL4. The transistor TR may include an active layer ACT, a gate electrode GE, a source electrode SE, and a drain electrode DE. The light emitting device layer LEL may be disposed on the circuit element layer CEL and may include a fifth insulating layer IL5 and a light emitting diode LD. The light emitting diode LD may include the electrode layer EDL, a light emitting layer EL, and the conductive layer CDL.

The buffer layer BFR may be disposed on the base substrate BS. The buffer layer BFR can prevent diffusion of metal atoms or impurities from the base substrate BS into the active layer ACT.

The active layer ACT may be disposed on the base substrate BS. The active layer ACT may be divided into a source region and a drain region doped with impurities, and a channel region disposed between the source region and the drain region.

The first insulating layer IL1 may be disposed on the buffer layer BFR. The first insulating layer IL1 may cover the active layer ACT. In an embodiment, the first insulating layer IL1 is formed to have substantially a same thickness along a profile of the active layer ACT. However, the present disclosure is not limited thereto. For example, the first insulating layer IL1 may be disposed on the active layer ACT in a pattern. For example, the first insulating layer IL1 may include an inorganic material.

The gate electrode GE may be disposed on the first insulating layer IL1. In an embodiment, the gate electrode GE overlaps the channel region of the active layer ACT.

The second insulating layer IL2 may be disposed on the first insulating layer IL1. In addition, the second insulating layer IL2 may cover the gate electrode GE. In an embodiment, the second insulating layer IL2 is disposed to have substantially a same thickness along a profile of the gate electrode GE. However, the present disclosure is not limited thereto.

The source electrode SE and the drain electrode DE may be disposed on the second insulating layer IL2. The source electrode SE may contact a source region of the active layer ACT through a first contact hole formed in the first and second insulating layers IL1 and IL2. The drain electrode DE may contact a drain region of the active layer ACT through a second contact hole formed in the first and second insulating layers IL1 and IL2.

The third insulating layer IL3 may be disposed on the second insulating layer IL2. In addition, the third insulating layer IL3 may cover the source and drain electrodes SE and DE. In an embodiment, the third insulating layer IL3 has a substantially flat upper surface without a step around the source and drain electrodes SE and DE. For example, the third insulating layer IL3 may include an organic material.

The connection electrode CNP may be disposed on the third insulating layer IL3. The connection electrode CNP may contact the source electrode SE or the drain electrode DE through a third contact hole formed in the third insulating layer IL3. For example, although FIG. 4 shows the connection electrode CNP contacting the drain electrode DE, the CNP and third contact hole can instead be formed closer to the source electrode SE to enable the CNP to contact the source electrode SE more easily.

The fourth insulating layer IL4 may be disposed on the third insulating layer IL3. In addition, the fourth insulating layer IL4 may cover the connection electrode CNP. In an embodiment, the fourth insulating layer IL4 has a substantially flat upper surface without a step around the source and drain electrodes SE and DE. For example, the fourth insulating layer IL4 may include an organic material.

The electrode layer EDL may be disposed on the fourth insulating layer IL4. The electrode layer EDL may be reflective or transparent. For example, the electrode layer EDL may include metal. In an embodiment, the electrode layer EDL may refer to a pixel electrode. When the electrode layer EDL includes metal with high reflectivity, the electrode layer EDL may reflect light generated from the pixels PX.

The electrode layer EDL may contact the connection electrode CNP through a fourth contact hole formed in the fourth insulating layer IL4. Through the connection electrode CNP, the electrode layer EDL may be connected to the transistor TR.

The fifth insulating layer IL5 may be disposed on the fourth insulating layer IL4. An opening exposing an upper surface of the electrode layer EDL may be defined in the fifth insulating layer IL5. For example, a gap may be present in the fifth insulating layer IL5 that overlaps the upper surface of the electrode layer EDL. For example, the fifth insulating layer IL5 may include an organic material or an inorganic material.

The light emitting layer EL may be disposed on the electrode layer EDL. The light emitting layer EL may be disposed in the opening formed in the fifth insulating layer IL5. In an embodiment, the light emitting layer EL may have a multi-layer structure including a hole injection layer, a hole transport layer, an organic light emitting layer, an electron transport layer, and an electron injection layer. The organic light emitting layer may include a light emitting material.

The conductive layer CDL may cover the light emitting layer EL and may be disposed on the fifth insulating layer IL5. In an embodiment, the conductive layer CDL may have a plate or rectangular shape. In addition, the conductive layer CDL may be transparent or reflective. For example, the conductive layer CDL may include metal.

The encapsulation layer ECL can prevent moisture and oxygen from penetrating into the light emitting diode LD from the outside. For example, the encapsulation layer ECL may include the first inorganic layer IEL1, the organic layer OEL, and the second inorganic layer IEL2.

The first inorganic layer IEL1 may be disposed on the conductive layer CDL. In an embodiment, the first inorganic layer IEL1 has the same or substantially the same thickness along a profile of the conductive layer CDL. The organic layer OEL may be disposed on the first inorganic layer IEL1. In an embodiment, the organic layer OEL has a substantially flat upper surface without a step around the first inorganic layer IEL1. The second inorganic layer IEL2 may be disposed on the organic layer OEL.

In an embodiment, the plurality of thin films TF may refer to layers disposed on the electrode layer EDL. That is, the plurality of thin films TF may include the light emitting layer EL, the conductive layer CDL, and the encapsulation layer ECL. However, the present disclosure is not limited thereto. In an embodiment, the thickness of the organic layer OEL included in the encapsulation layer ECL is greater than the thickness of the inorganic layer IEL and the thickness of the conductive layer CDL.

Hereinafter, the thickness measuring method using the thickness measuring device 10 will be described.

Referring to FIGS. 1, 2, 3, and 4, light emitted from the light source LS may be irradiated onto the surface of the substrate 100. In an embodiment, the light source portion LSP irradiates light to an area of the substrate 100 overlapping the electrode layer EDL. The area where light emitted from the light source LS meets or contacts the surface of the substrate 100 may be referred to as a spot size SS. That is, the spot size SS may mean a measurement area of the thickness measuring device 10.

In an embodiment, a reflectance of the electrode layer EDL is higher than the reflectance of each of the plurality of thin films TF. Accordingly, when light generated from the light source LS reaches the electrode layer EDL, the light may be reflected by the electrode layer EDL. In this case, since the thickness measuring device 10 is used to measure the thickness of one of the plurality of thin films TF, noise caused by layers under the electrode layer EDL can be removed. Specifically, because light is reflected by the electrode layer EDL, data from layers under the electrode layer EDL may not be measured.

Accordingly, a width W1 of the spot size SS may be smaller than or equal to a width W2 of the electrode layer EDL. At this time, the width W2 of the electrode layer EDL may be the same as or substantially the same as the width of the light emitting diode LD. When the width W1 of the spot size SS is greater than the width W2 of the electrode layer EDL, in areas where the electrode layer EDL is not disposed, reflectance spectrum data for each wavelength by the circuit element layer CEL under the electrode layer EDL may be measured. For this reason, noise may be generated in the reflectance spectrum data for each wavelength by the thickness measurement device 10, and it may be difficult for the thickness measurement device 10 to measure the thickness of a desired layer.

In an embodiment, the magnification of the lens LES is adjusted so that the width W1 of the spot size SS is less than or equal to the width W2 of the electrode layer EDL. That is, as the magnification of the lens LES increases, the width W1 of the spot size SS may decrease.

Accordingly, the magnification of the lens LES may be increased so that the width W1 of the spot size SS is smaller than or equal to the width W2 of the electrode layer EDL. In an embodiment, the magnification of the lens LES is about 10 times. When the magnification of the lens LES is less than about 10 times, the width W1 of the spot size SS may be increased. Therefore, more noise may occur in reflectance spectrum data for each wavelength. In addition, when the magnification of the lens LES is greater than about 10 times, the width W1 of the spot size SS becomes small, but the depth of focus also becomes shallow, so reflection of light by the electrode layer EDL might not occur. Accordingly, there may not be enough data to derive reflectance spectrum data for each wavelength.

Light irradiated to the surface of the substrate 100 may be reflected on the surface of the substrate 100, and light reflected on the surface of the substrate 100 may pass through the lens LES. Light which is reflected on the surface of the substrate 100 and passes through the lens LES may be incident on the detector DT. At this time, the detector DT may measure reflectance for each wavelength of the light. When the light emitted from the light source LS has a wavelength between about 600 nanometers and about 800 nanometers, the reflectance for each wavelength of light incident on the detector DT may be measured.

In addition, the detector DT may derive reflectance spectrum data for each wavelength of the light using a reflectance for each wavelength. For example, a spectrometer of the detector DT may measure a reflectance for each wavelength of light reflected from the surface of the substrate 100 and passed through the lens LES to generate a plurality of reflectance values, and the detector DT may generate reflectance spectrum data for each wavelength using the plurality of reflectance values.

The control portion CTR may convert the reflectance spectrum data for each wavelength of light into a digital signal. In an embodiment, the control portion CTR includes an analog to digital converter to convert the reflectance spectrum data into the digital signal. In an embodiment, the control portion CTR performs a fast Fourier transform on the converted digital signal. In addition, the control portion CTR may calculate the thickness of at least one thin film among the plurality of thin films TF using a result of the performed fast Fourier transform. In an embodiment, a refractive index of each of the plurality of thin films TF is measured to calculate the thickness of the thin film.

Hereinafter, a method for calculating the thickness of a thin film will be exemplarily described with reference to FIGS. 5, 6, and 7.

Figure 5:
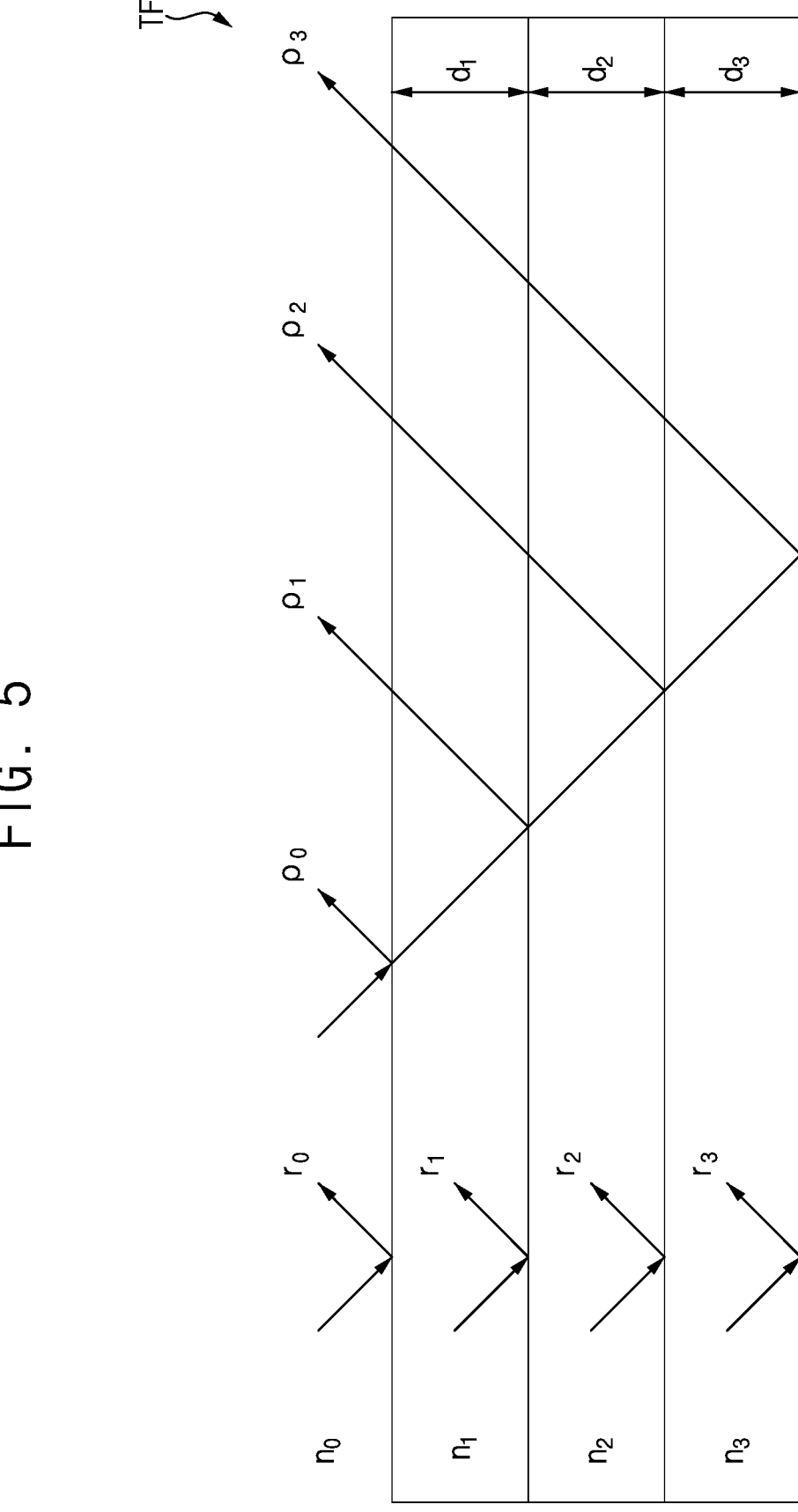
FIG. 5 is a cross-sectional view schematically illustrating a plurality of thin films.

FIG. 5 is a cross-sectional view schematically illustrating a plurality of thin films. FIG. 6 is a graph of reflectance spectrum data by wavelength. FIG. 7 is a graph obtained by fast Fourier transforming the reflectance spectrum data of FIG. 6.

Figure 6:
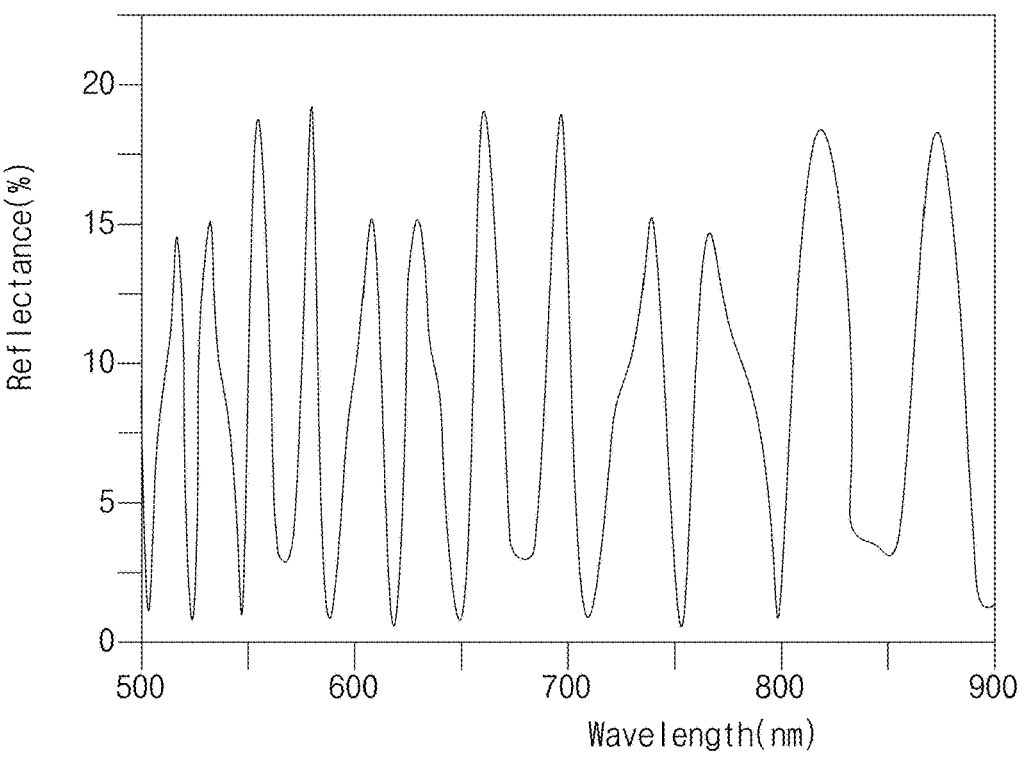
FIG. 6 is a graph of reflectance spectrum data by wavelength.
Figure 7:
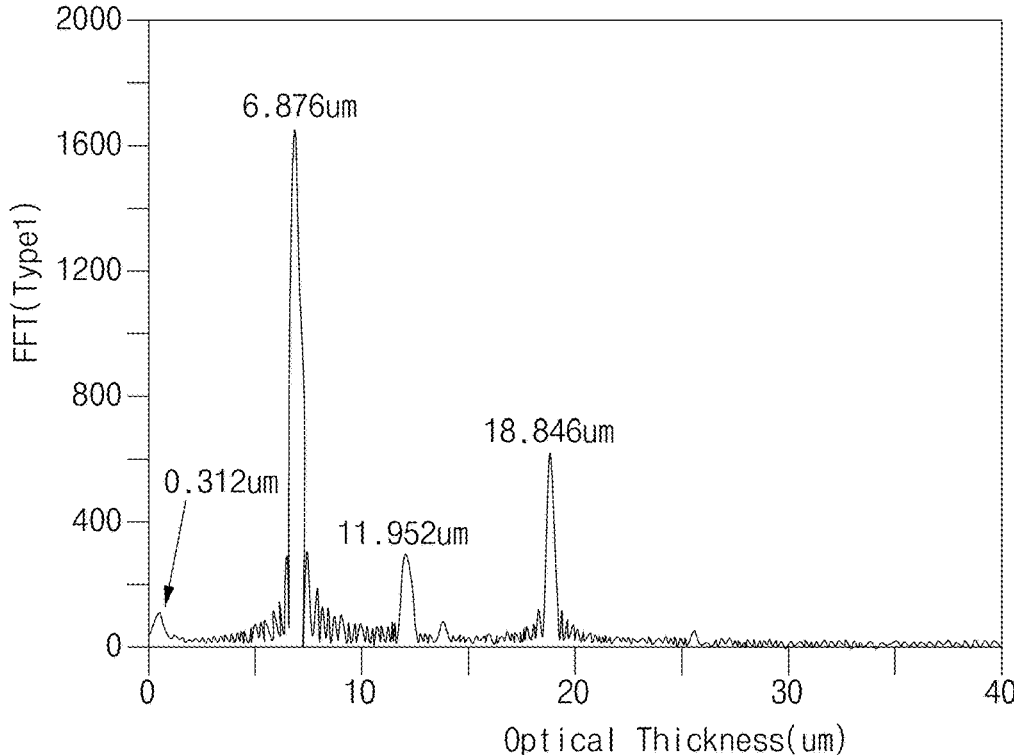
FIG. 7 is a graph obtained by fast Fourier transforming the reflectance spectrum data of FIG. 6.

Referring to FIGS. 5, 6, and 7, when light is incident on the plurality of thin films TF, a part of the light may be reflected at each boundary surface and a part of the light may be transmitted. If the reflection coefficients of each boundary are $r_0$, $r_1$, $r_2$, and $r_3$, each reflection amplitude coefficient can be expressed as Equation 1 below.

$$\rho_0 = r_0 \quad \text{[Equation 1]}$$

$$\rho_1 = r_1 e^{-i2\delta_1}$$

$$\rho_2 = r_2 e^{-i2(\delta_1+\delta_2)}$$

$$\rho_3 = r_3 e^{-i2(\delta_1+\delta_2+\delta_3)}$$

$$\vdots$$

Here, $\delta$ is the optical phase thickness, and can be expressed in Equation 2 below.

$$\delta = \frac{2\pi}{\lambda} n_j d_j \cos\theta_j \quad \text{[Equation 2]}$$

Here, $n_j$ is the refractive index of the $j_{th}$ thin film, $d_j$ is the thickness of the $j_{th}$ thin film, $\theta_j$ is the refraction angle for light of the $j_{th}$ thin film, and $\lambda$ is the wavelength of the incident light. The total reflection amplitude coefficient $\rho$ of the reflected light is the sum of Equation 1 and can be expressed as Equation 3 below.

$$\rho = \rho_0 + \rho_1 + \rho_2 + \rho_3 + \dots \quad \text{[Equation 3]}$$

$$= r_0 + r_1 e^{-i2\delta_1} + r_2 e^{-i2(\delta_1+\delta_2)} + r_3 e^{-i2(\delta_1+\delta_2+\delta_3)} + \dots$$

In addition, a reflectance R obtained by squaring the reflection amplitude coefficient can be expressed as Equation 4 below.

$$R = |\rho|^2 = r_0^2 + r_1^2\cos2\delta_1 + r_1 r_2\cos2\delta_2 + \quad \text{[Equation 4]}$$

$$r_2 r_3\cos2\delta_3 + r_2^2\cos2(\delta_1+\delta_2) + r_3^2\cos2(\delta_1+\delta_2+\delta_3) \dots$$

At this time, if Equation 4 is expressed as a function of wave number k, Equation 4 can be expressed as Equation 5, which has the Fourier series form below.

$$R(k) = |\rho(k)|^2 = r_0^2 + r_1^2\cos kz_1 + r_1 r_2\cos kz_2 + \quad \text{[Equation 5]}$$

$$r_2 r_3\cos kz_3 + r_2^2\cos k(z_1+z_2) + r_3^2\cos k(z_1+z_2+z_3) \dots$$

Here, the wave number k is $2\pi/\lambda$, z is twice the optical thickness of the $j_{th}$ layer, and when light is incident perpendicularly, $z_j = 2n_j d_j$. In addition, a graph representing Equation 5 may be the reflectance spectrum graph for each wavelength in FIG. 6.

In an embodiment, when Equation 5 is Fourier transformed, Equation 5 can be expressed as Equation 6 below.

$$R(z) = \quad \text{[Equation 6]}$$

$$FT\{R(k)\} = a_0\delta(z) + \frac{1}{2}[a_1\delta(z-z_1) + a_2\delta(z-z_2) + a_3\delta(z-z_3) +$$

$$a_4\delta(z-z_1-z_2) + a_5\delta(z-z_1-z_3) + a_5\delta(z-z_1-z_2-z_3) \dots] +$$

$$\frac{1}{2}[a_1\delta(z+z_1) + a_2\delta(z+z_2) + a_3\delta(z+z_3) + a_4\delta(z+z_1+z_2) +$$

$$a_5\delta(z+z_1+z_3) + a_5\delta(z+z_1+z_2+z_3) \dots]$$

Here, $a_0$, $a_1$, $a_2$, $a_3$, $a_4$, $a_5$, and $a_6$ constants that occur in the Fourier transform. In addition, if only the part where z is 0 or more in Equation 6 is taken, Equation 6 can be expressed as Equation 7 below.

$$R(z) = a_0\delta(z) + \frac{1}{2}[a_1\delta(z-z_1) + a_2\delta(z-z_2) + a_3\delta(z-z_3) + \quad \text{[Equation 7]}$$

$$a_4\delta(z-z_1-z_2) + a_5\delta(z-z_1-z_3) + a_6\delta(z-z_1-z_2-z_3) + \dots]$$

At this time, a graph representing Equation 7 may be the Fourier transform graph of FIG. 7. That is, the Fourier transform graph of FIG. 7 may appear by performing a fast Fourier transform on the reflectance spectrum for each wavelength in FIG. 6.

In an example, as a result of the fast Fourier transform, the positions where the peak of the delta function exists correspond to the optical thicknesses $z_2 = 0.312$ micrometers, $z_1 = 6.876$ micrometers, $z_3 = 11.952$ micrometers, and $z_1 + z_3 = 18.846$ micrometers. This can be derived by correlating the approximate thickness of each of the plurality of thin films TF with the location of the peak. Through this, the thickness of each of the plurality of thin films TF can be determined. In the example, shown in FIG. 5, $d_1 = 4.045$ micrometers, $d_2$ is 0.214 micrometers, and $d_3$ is 7.030 micrometers. In this example, the thickness of each of a first layer and a third layer of the plurality of thin films TF of FIG. 5 may be relatively greater than the thickness of a second layer. In addition, the thicker the thickness of the thin film derived through the above thickness measurement method, the higher the accuracy.

Referring again to FIGS. 1, 2, 3, and 4, in an embodiment, the thickness measuring device 10 may calculate the thickness of the organic layer OEL among the plurality of thin films TF. Among the plurality of thin films TF, the organic layer OEL may have the greatest thickness. For example, the thickness of the organic layer OEL may be about 10 times greater than the thickness of the inorganic layer IEL and the thickness of the conductive layer CDL. Accordingly, even when calculating the thickness of each of the plurality of thin films TF using the thickness measuring device 10, the thickness of the organic layer OEL can be easily identified. Accordingly, when measuring the thickness of the plurality of thin films TF using the thickness measuring device 10, the thickness of the organic layer OEL among the plurality of thin films TF can be selectively derived. For example, if measuring by the thickness measuring device 10 results in a plurality of thicknesses, the highest resulting thickness could be interpreted as the thickness of the organic layer OEL.

In an embodiment, by measuring an entire area of the substrate 100 using the thickness measuring device 10, only the thickness of the organic layer OEL among the plurality of thin films TF may be selectively measured. At this time, by measuring the entire area of the substrate 100, the thickness of each area of the organic layer OEL may be measured. Therefore, the thickness of the organic layer OEL can be measured without a separate tag area. In addition, since the thickness of the organic layer OEL within the display area DA of the substrate 100 can be directly measured, measurement accuracy can be increased.

Figure 8:
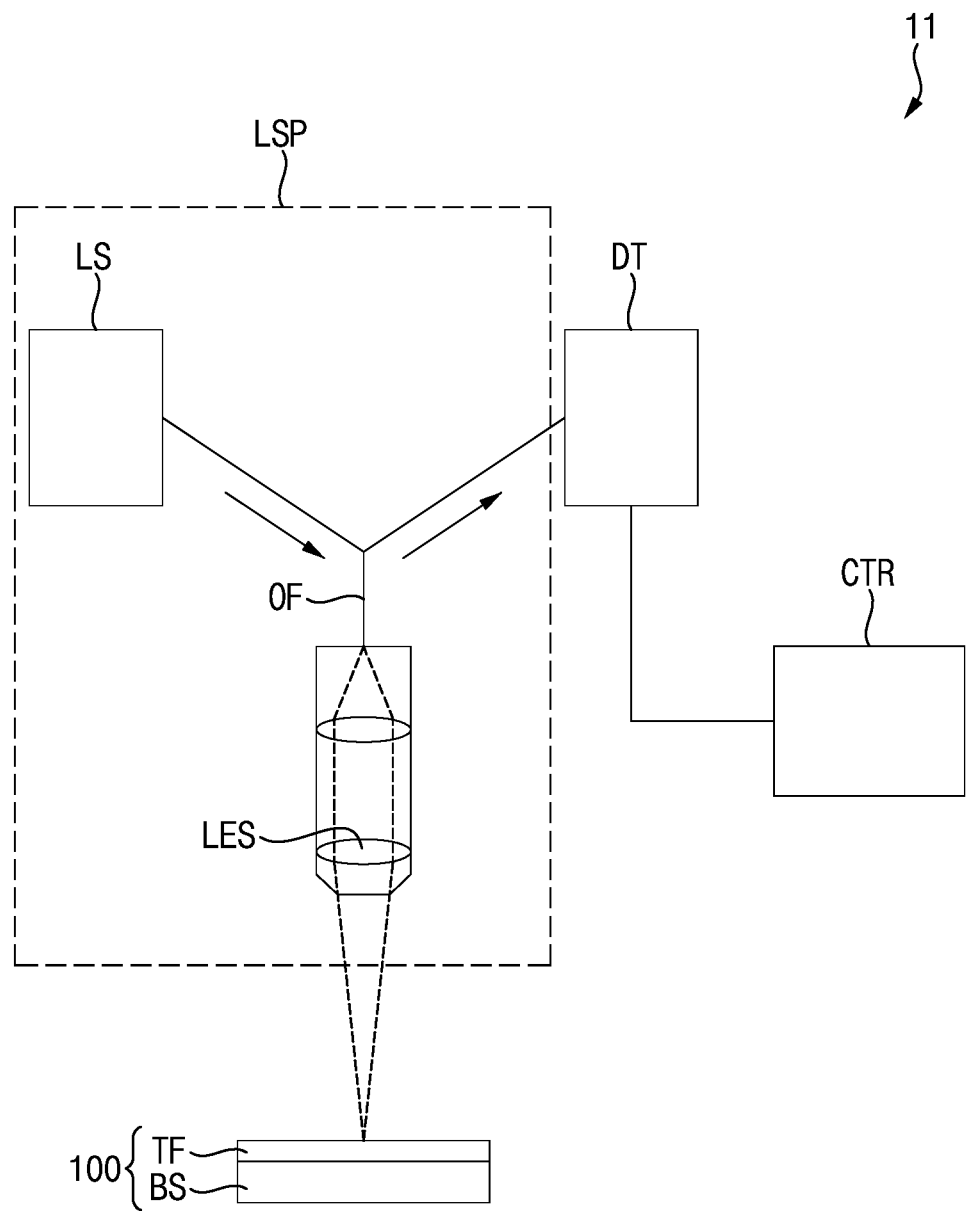
FIG. 8 is a view schematically illustrating a thickness measuring device according to an embodiment of the present disclosure.

FIG. 8 is a view schematically illustrating a thickness measuring device according to an embodiment of the present disclosure.

A thickness measuring device 11 described with reference to FIG. 8 may be the same as the thickness measuring device 10 described with reference to FIG. 1 except for further including an optical fiber OF. Accordingly, overlapping descriptions may be omitted or simplified.

Referring to FIG. 8, the thickness measuring device 11 may include a light source portion LSP, a detector DT, and a control portion CTR. The thickness measuring device 11 may measure the thickness of a plurality of thin films TF included in the substrate 100. The substrate 100 is a measurement object and may be, for example, a display device.

The light source portion LSP may include a light source LS, lenses LES, a half mirror HM, and an optical fiber OF.

In an embodiment, the optical fiber OF focuses the light emitted from the light source LS and irradiates the light through one side of the optical fiber OF. Light irradiated from the optical fiber OF may pass through the lens LES and be reflected on the surface of the substrate 100. The optical fiber OF may receive light reflected from the surface of the substrate 100 that passes through the lens LES, and may emit the light through another side of the optical fiber OF. Light emitted from the other side of the optical fiber OF may be incident on the detector DT. For example, the downwardly pointing arrow in FIG. 8 illustrates light from the light source LS passing through the optical fiber OF and the upwardly pointing arrow in FIG. 8 illustrates light from the lens LES passing through the optical fiber OF to the detector DT.

In an embodiment, the size (or diameter) of the optical fiber OF is adjusted so that the width of a spot size (e.g., the spot size SS of FIG. 3) is less than or equal to the width of an electrode layer (e.g., the electrode layer EDL of FIG. 4). In an embodiment, a plurality of optical fibers of difference size or diameter are present, and an actuator is further present that moves one of the optical fibers in place in response to a control signal. For example, the control portion CTR may provide the control signal to the actuator that indicates which one of the optical fibers to select. That is, when the thickness measuring device 10 further includes the optical fiber OF, not only the magnification of the lens LES but also the size of the optical fiber OF may affect the width of the spot size. As the size of the optical fiber OF decreases, the width of the spot size may also decrease. That is, the spot size of the thickness measuring device 10 may be adjusted by both adjusting the magnification of the lens LES and the size of the optical fiber OF.

For example, the size of the optical fiber OF may range from about 50 micrometers to about 500 micrometers. For example, the size of the optical fiber OF may refer to the diameter of the optical fiber OF. When the size of the optical fiber OF is less than about 50 micrometers, the intensity of light may be reduced. Accordingly, the intensity of light is small and measurement may not be easy. In addition, when the size of the optical fiber OF is larger than about 500 micrometers, the spot size may increase and noise may be generated, thereby reducing measurement accuracy.

The thickness measuring device and the thickness measuring method according to embodiments of the present disclosure may be applied to display devices included in a computer, a laptop, a mobile phone, a smartphone, a smart pad, an automobile, a personal media play (PMP), a personal digital assistant (PDA), an MP3 player, and the like.

The foregoing is illustrative of embodiments and is not to be construed as limiting thereof. Although a few embodiments have been described, those skilled in the art will readily appreciate that many modifications are possible in the embodiments without materially departing from the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A thickness measuring device comprising:
a light source circuit including:
    a light source configured to irradiate light onto a surface of a substrate including a plurality of thin films; and
    a lens configured to magnify light emitted from the light source or reflected from the surface of the substrate;
a detector circuit configured to measure a reflectance for each wavelength of light reflected from the surface of the substrate and passed through the lens to generate a plurality of reflectance values and derive reflectance spectrum data for each wavelength from the reflectance values; and
a control circuit configured to convert the reflectance spectrum data for each wavelength into a digital signal, perform a fast Fourier transform on the converted digital signal, calculate a thickness of at least one thin film among the plurality of thin films from a result of the fast Fourier transform, and control an optical parameter of the light source circuit so that a width of a spot size generated when the light meets the surface of the substrate is less than or equal to a width of an electrode layer disposed under the plurality of thin films in a direction parallel to the surface of the substrate.

2. The thickness measuring device of claim 1, wherein the light source circuit is configured to irradiate the light in a direction perpendicular to the surface of the substrate.

3. The thickness measuring device of claim 1, wherein the plurality of thin films include:

at least one organic layer including an organic material;

at least one inorganic layer including an inorganic material; and at least one conductive layer including a conductive material.

4. The thickness measuring device of claim 3, wherein the control circuit is configured to calculate a thickness of the organic layer among the plurality of thin films.

5. The thickness measuring device of claim 3, wherein the thickness of the organic layer is greater than a thickness of the inorganic layer and a thickness of the conductive layer.

6. The thickness measuring device of claim 1, wherein the lens has a magnification of 10 times.

7. The thickness measuring device of claim 1, wherein the light source circuit further includes:

an optical fiber configured to focus the light emitted from the light source and irradiate the light through one side of the optical fiber, and receive the light reflected from the surface of the substrate and emit the light through another side of the optical fiber.

8. The thickness measuring device of claim 7, wherein a diameter of the optical fiber ranges from 50 micrometers to 500 micrometers.

9. The thickness measuring device of claim 1, wherein the electrode layer has a higher reflectance than each of the plurality of thin films and is disposed under the plurality of thin films.

10. The thickness measuring device of claim 9, wherein the light source circuit is configured to irradiate the light to an area overlapping the electrode layer.

11. The thickness measuring device of claim 1, wherein a wavelength of the light emitted from the light source ranges from 600 nanometers to 800 nanometers.

12. A thickness measuring method comprising:

irradiating light emitted from a light source of a light source circuit onto a surface of a substrate including a plurality of thin films;

measuring a reflectance for each wavelength of light reflected from the surface of the substrate and passed through a lens to generate a plurality of reflectance values;

deriving reflectance spectrum data for each wavelength from the reflectance values;

converting the reflectance spectrum data for each wavelength into a digital signal;

performing a fast Fourier transform on the converted digital signal;

calculating a thickness of at least one thin film among the plurality of thin films from a result of the fast Fourier transform; and controlling an optical parameter of the light source circuit so that a width of a spot size generated when the light meets the surface of the substrate is less than or equal to a width of an electrode layer disposed under the plurality of thin films in a direction parallel to the surface of the substrate.

13. The thickness measuring method of claim 12, wherein the calculating the thickness of at least one thin film includes:

measuring a refractive index of each of the plurality of thin films.

14. The thickness measuring method of claim 12, wherein the irradiating comprises the light source applying light to an area overlapping with an electrode layer having a reflectance higher than a reflectance of each of the plurality of thin films, and the electrode layer is disposed under the plurality of thin films.

15. The thickness measuring method of claim 14, wherein the optical parameter is a magnification of the lens.

16. The thickness measuring method of claim 14, wherein the irradiating the light includes:

irradiating the light through one end of an optical fiber.

17. The thickness measuring method of claim 16, further comprising:

emitting the light through another side of the optical fiber by receiving the light reflected from the surface of the substrate and passed through the lens into the optical fiber.

18. The thickness measuring method of claim 17, wherein the optical parameter is a diameter of the optical fiber.

* * * * *